(12) United States Patent
Brand et al.

(10) Patent No.: US 6,802,705 B2
(45) Date of Patent: Oct. 12, 2004

(54) POST MOLD COOLING ASSEMBLY FOR MOLDED ARTICLE NECK FINISHES

(75) Inventors: Tiemo D. Brand, North York (CA); Jacob Rebel, Orangeville (CA)

(73) Assignee: Husky Injection Molding Systems Ltd. (CA)

( * ) Notice: Subject to any disclaimer, the term of this patent is extended or adjusted under 35 U.S.C. 154(b) by 179 days.

(21) Appl. No.: 09/948,917

(22) Filed: Sep. 10, 2001

(65) Prior Publication Data

US 2003/0057598 A1 Mar. 27, 2003

(51) Int. Cl.[7] ............................................... B29C 45/72
(52) U.S. Cl. .................. 425/547; 264/908; 425/446; 425/526; 425/548; 425/552
(58) Field of Search ........................... 425/526, 547, 425/548, 552, 445, 446; 264/908

(56) References Cited

U.S. PATENT DOCUMENTS

| | | | |
|---|---|---|---|
| 4,449,913 A | 5/1984 | Krishnakumar et al. | 425/548 |
| 4,472,131 A | 9/1984 | Ryder | 425/548 |
| 4,729,732 A | 3/1988 | Schad et al. | 425/526 |
| RE33,237 E | 6/1990 | Delfer, III | 425/547 |
| 4,950,152 A | 8/1990 | Brun, Jr. et al. | 425/533 |
| 5,114,327 A | 5/1992 | Williamson et al. | 425/139 |
| 5,232,715 A | 8/1993 | Fukai | 425/526 |
| 5,338,172 A | 8/1994 | Williamson et al. | 425/143 |
| 5,447,426 A | 9/1995 | Gessner et al. | 425/436 R |
| 5,514,309 A | 5/1996 | Williamson et al. | 264/37 |
| 5,599,567 A | 2/1997 | Gellert | 425/526 |
| 5,707,662 A | 1/1998 | Bright et al. | 425/547 |
| 5,728,409 A | 3/1998 | Schad et al. | 425/130 |
| 5,837,299 A | 11/1998 | Bright et al. | 425/526 |
| 6,059,557 A | 5/2000 | Ing et al. | 425/552 |
| 6,079,972 A | 6/2000 | Gellert | 425/552 |
| 6,095,788 A | 8/2000 | van Manen et al. | 425/526 |
| 6,171,541 B1 | 1/2001 | Neter et al. | 264/328.14 |
| 6,223,541 B1 * | 5/2001 | Farrag | 425/526 |
| 6,461,556 B1 * | 10/2002 | Neter | 425/547 |
| 6,488,878 B1 * | 12/2002 | Neter et al. | 425/547 |

FOREIGN PATENT DOCUMENTS

| | | | | |
|---|---|---|---|---|
| DE | 298 10 567 U1 | 10/1998 | | B29C/49/64 |
| EP | 0 481 868 B1 | 11/1995 | | B29B/13/04 |
| EP | 1 065 035 A2 | 1/2001 | | B29C/45/72 |
| JP | 7-171888 | 11/1995 | | B29C/49/64 |
| JP | 2000108170 | 4/2000 | | B29C/45/42 |
| WO | WO 01/19589 A1 | 3/2001 | | B29C/45/72 |
| WO | WO 02/051614 A1 | 7/2002 | | B29C/45/72 |

* cited by examiner

*Primary Examiner*—Tim Heitbrink
(74) *Attorney, Agent, or Firm*—Katten Muchin; Zavis Rosenman

(57) ABSTRACT

A cooling apparatus and method for the post mold cooling of injection molded articles where an exterior portion of the article is exposed to a cooling atmosphere separately from any other cooling of the article. More particularly, the external surface of a neck finish portion of a preform is cooled by way of a cooling fluid stream which is specifically directed at the external surface.

41 Claims, 13 Drawing Sheets

POST MOLD COOLING ASSEMBLY FOR MOLDED ARTICLE NECK FINISHES

BACKGROUND OF THE INVENTION

1. Field of the Invention

The present invention broadly relates to injection-molding machines and, in particular, to the manner in which a molded article from an injection-molding machine is cooled.

2. Summary of the Prior Art

Injection-molding machines are very well known and there are many ways of cooling a preform created by such machines. The following references all disclose apparatus and methods for cooling such preforms.

U.S. Pat. No. 4,449,913 to Krishnakumar et al describes a turret-molding machine in which the preforms are first cooled to a set or crystallized state in the injection mold before they are removed from the mold cavity. When set, the preforms are rotated to a cooling position where nozzles 54 direct coolant onto the tip of the preform so that the preform will cool from its tip towards the neck portion of the preform. After cooling the preform is rotated to a conditioning mold 46 for final cooling of the preform. The cores 26 are supplied with coolant so as to assure cooling of the preforms radially outwardly. Additional cooling to the exterior of the preforms is provided by the coolant lines 74, which open generally radially into the conditioning cavities 48. After the preform is removed from the mold cavity, the threaded neck finish portion of the preform is not directly exposed to any exterior cooling and is only exposed to interior cooling from the coolant flowing through chamber 62 into the cores 26.

U.S. Pat. No. 4,472,131 to Ryder describes a preform molding machine in which alternating rows of molding and supercooling cavities are mounted on the molding plate so that as a row of preforms is molded an alternate row of preforms is supercooled. The patent does not provide a coolant flow directly to the neck portion of the preform either while the preform remains in contact with the molding surface or after removal from the molding surface.

U.S. Pat. No. 4,729,732 to Schad et al describes a preform molding and blow molding process where the preforms are temperature conditioned while being transported from the preform molding station to a blow molding machine. During the temperature conditioning, the neck portion of the preform is provided with a protective cover so that it is not subjected to the temperature equalization step. The patent does not describe any means for positively cooling the neck portion of the preform.

U.S. Reissue Pat. No. 33,237 to Delfer, III, describes a preform molding system in which the carrier plate has a number of receiving cavities which is a multiple of the number of mold cavities in the injection-molding machine. This enables the preforms to be held in the carrier plate for a multiple of molding cycles and to be fully cooled in the carrier plate. The patent does not provide means for directly cooling the neck portion of a preform.

U.S. Pat. No. 4,950,152 to Brun, Jr. et al describes a preform cooling system where the preforms are moved to a cooling station in which they are expanded by the application of pressurized air to conform with a stationary mold platen that is maintained at a relatively constant temperature. The neck portion of the preform does not contact the cooling surface of the stationary platen. The patent does not show means for directly cooling the neck portion of a preform.

U.S. Pat. Nos. 5,114,327, 5,338,172 and 5,514,309 to Williamson et al describe an apparatus that comprises an external holder tube and an inner probe that combine in assembly to enclose the preform such that a cooling fluid, such as liquid carbon dioxide, is circulated over both the inner and outer surfaces of the preform including the neck finish portion. The preform is enclosed in a closed circuit environment so that the cooling fluid may be recovered. The patents do not disclose means for creating a specific flow direction or distribution of the cooling media in the neck finish portion so as to promote a balanced thermal transfer of heat from the preform.

U.S. Pat. No. 5,232,715 to Fukar describes cooling a preform wherein cooling air is provided to the interior and exterior of the preform simultaneously. The external cooling air flows over the tip of the preform towards the neck portion, which is held in a neck mold. There is no direct cooling of the neck portion.

U.S. Pat. No. 5,599,567 to Gellert describes thread split inserts for holding a preform that include cooling passages within the inserts so that the neck portion of the preform can be positively cooled at its exterior surface while held in the molding machine. The patent does not describe any means for controllably cooling the neck portion of the preform when removed from the mold.

U.S. Pat. No. 5,707,662 to Bright et al describes a preform cooling apparatus in which cooling fluid flows through a high thermally conductive insert, which surrounds the preform. The neck portion of the preform is not confined within the thermally conductive insert and is not directly cooled by it.

U.S. Pat. No. 5,728,409 to Schad et al describes a turret injection-molding machine in which preforms remain on the cooled mold core for an extended period of time after molding while cool air is blown over their exterior finishes. These machines have mold inserts for forming the neck finish portion of the preform and are water-cooled. The inserts remain in their molding position surrounding the neck finish portion of the molded preforms during subsequent turret positions where air-cooling is being directed onto the preform's exterior surface. The patent does not provide any means for controllably cooling the neck finish portion of the preform after the preform leaves the molding surface.

U.S. Pat. No. 5,837,299 to Bright et al describes a preform post mold cooling system in which a coolant medium flows around an elastic insert. This enables the transfer of heat from the preform to the coolant fluid. The neck portion of the preform is not in direct contact with the elastic insert and is not directly cooled thereby.

U.S. Pat. No. 6,059,557 to Ing et al describes a turret-molding machine in which cooling tubes cool the exterior of the preform. The neck portion of the preform is not directly cooled. The invention provides a two-turret machine with a cycle time equivalent to that of the prior art four-turret machine.

U.S. Pat. No. 6,079,972 to Gellert describes a mold-cooling core, which has opposed spiral grooves that enable turbulent coolant flow through the core. The patent does not disclose any means for cooling the preform externally of the mold.

U.S. Pat. No. 6,095,788 to Dirk van Manen et al describes a preform cooling arrangement where cooling tubes are located adjacent molding cavities so that during each cycle a preform is molded in each molding cavity and another preform is cooled in an adjacent cooling cavity. During the entire cycle the neck portion of the preform is held in a neck ring. The arrangement reduces the stroke of the machine but does not provide any direct cooling of the neck portion of the preform.

U.S. Pat. No. 6,171,541 to Neter et al describes a post mold preform cooling system in which both the interior and then the exterior of the preform are cooled in a controlled manner. While the patent describes a number of ways of cooling the exterior of the preform, it does not describe any means for directly cooling the external surface of the neck portion of the preform.

U.S. Pat. No. 6,223,541 to Farrag describes a post-mold preform cooling station in which coolant is provide through a tube 17 to the interior surface of the preform and flows over the inner surface of the preform in a direction from the tip to the neck of the preform.

These latter two patents do not describe direct cooling of the neck portion although the partially warmed coolant flowing up the interior of the preform would surround both the interior and exterior surfaces of the neck portion on its path through the apparatus.

Japanese Patent Publication 7-171888 to Hirowatari describes a preform cooling apparatus where cooling fluid is directed toward the neck area of the molded preform. As shown in FIG. 1, the cooling nozzles can be placed in any one of position N1, N2 or N3. However, in each case the coolant fluid is directed to the inside surfaces of the preform and not the exterior surfaces. The alternative positions of the nozzle are suggested so as to ensure that there is no entrapment of coolant air within the preform as might occur if the nozzle was positioned in position N1.

It is evident from the above prior art that direct cooling of the external surface of the neck finish portion of a preform after it has left the molding surface was considered unnecessary. In the prior art examples, the external neck finish portion is only positively cooled within the mold and/or secondarily cooled outside the mold surfaces by coolant that has already cooled other portions of the preform.

It has been found, at least with some preforms, that the neck finish portion of the preform may become distorted when using the cooling methods of the prior art. In particular, the neck finish portion may become oval or the threads themselves become imperfect.

The inventors have discovered that the problem can be overcome if the external face of the threaded neck finish portion of the preform is directly cooled after it is removed from the mold. The present invention provides a new apparatus and method for cooling the preforms after they are removed from the mold.

There are a number of problems and deficiencies with the known prior art devices.

SUMMARY OF THE INVENTION

The primary objective of the present invention is to provide an improved method and apparatus for cooling preforms after they are removed from a mold cavity.

Another object of the present invention is to provide a method and apparatus for post-mold cooling of the threaded neck finish portion of a preform.

Another object of the present invention is to provide a method and apparatus for the post-mold cooling of the external surface of the neck finish portion of a preform.

Another object of the present invention is to provide a mold take-off plate with improved preform cooling thereon.

Another object of the present invention is to reduce the cycle time of the injection-molding machine.

The present invention is achieved by a cooling apparatus for post mold cooling a preform which comprises an entry port for receiving a supply of coolant, a director and an exit port for discharging said coolant, the director receives a said supply of coolant from the entry port and delivers the coolant to the exit port which provides focused release of the coolant about an outer surface of a neck finish portion of the preform to thereby cool the outer surface of the neck finish portion.

The objects of the invention are further achieved by providing a cooling apparatus for post mold cooling of a preform which comprises a base having an entry port for receiving a supply of coolant and an insert, the base has a distributor for receiving the coolant and for providing it to the insert, the insert directs the coolant for controlled distribution of the coolant about an outer surface of a neck finish portion of the preform.

The foregoing objects are further achieved by providing an improved method for cooling a preform after ejection from an injection-molding machine, the method comprises the steps of ejecting the preform from the injection-molding machine onto a preform transfer device, exposing an exterior surface of a neck finish portion of the preform when on the transport device; and supplying a controlled and directed flow of coolant over the exposed exterior surface to thereby cool the neck finish portion in a controlled manner.

Further objects and advantages of the present invention will appear hereinbelow.

BRIEF DESCRIPTION OF THE DRAWINGS

Embodiments of the present invention will now be described, by way of example only, with reference to the attached figures, wherein.

Figure 1:
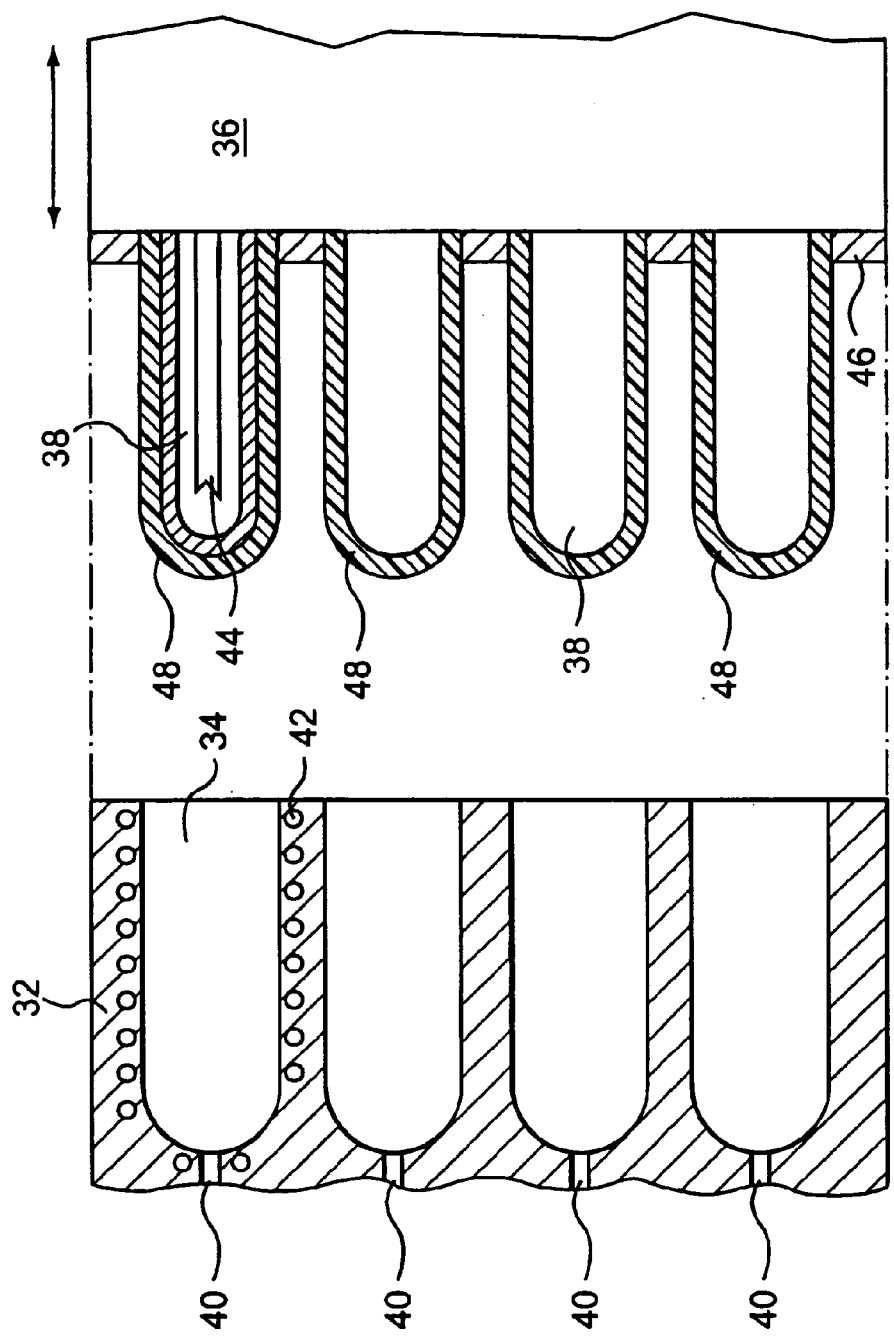
FIG. 1 is a sectional view of a prior art injection mold with the mold open.

| Nomenclature List | | |
|---|---|---|
| 1 | Gate | |
| 2 | Region | |
| 3 | Local Thin Section | |
| 4 | Local Thick Section | |
| 5 | Top Sealing Surface | |
| 10 | | |
| 12 | | |
| 14 | | |
| 16 | | |
| 18 | | |
| 20 | | |
| 22 | | |
| 24 | | |
| 26 | | |
| 27 | | |
| 28 | | |
| 30 | | |
| 32 | Mold Plate | |
| 34 | Mold Cavity | |
| 36 | Mold Plate | |
| 38 | Mold Core | |
| 40 | Mold Cavity Gate | |
| 42 | Cooling Means | |
| 44 | Cooling Means | |
| 46 | Ejector Plate | |
| 48 | Preform | |
| 50 | | |
| 51 | | |
| 52 | | |
| 53 | | |
| 54 | | |
| 55 | | |
| 56 | | |
| 57 | | |
| 58 | | |
| 60 | Take-off Plate | |
| 62 | Take-off Holder | |
| 64 | Hollow Tube | |
| 66 | | |
| 68 | | |
| 70 | Deflecting Plate | |
| 72 | | |
| 74 | Neck finish Portion | |
| 76 | Pressurized Air Flow | |
| 78 | Ambient Air | |
| 80 | Pressurized Air | |
| 82 | Air Channel | |
| 84 | Base | |
| 86 | Insert | |
| 88 | Bolts | |
| 90 | Space | |
| 92 | Circumferential Surface | |
| 94 | | |
| 96 | Gap | |
| 98 | Arrows | |
| 99 | Arrows | |
| 100 | | |
| 102 | | |
| 104 | | |
| 108 | | |
| 110 | Dome | |
| 112 | Body | |
| 114 | Support Ledge | |
| 116 | | |
| 118 | | |
| 120 | Insert | |
| 122 | Chamber | |
| 124 | Openings | |
| 126 | Arrows | |

| -continued | | |
|---|---|---|
| Nomenclature List | | |
| 128 | | |
| 130 | Sleeve | |
| 132 | Base Plate | |
| 134 | | |
| 136 | Threads | |
| 140 | Threaded Mount | |
| 144 | Chamber | |
| 146 | Supply Line | |
| 147 | | |
| 148 | Line | |
| 150 | Openings | |
| 152 | Openings | |
| 154 | | |
| 156 | | |
| 158 | | |
| 160 | Base Plate | |
| 162 | Insert | |
| 164 | Gap | |
| 166 | Circumferential Area | |
| 170 | Space | |
| 172 | Ambient Air | |
| 174 | | |
| 176 | | |
| 178 | | |
| 180 | Take-off Plate | |
| 182 | Dispersion Device | |
| 184 | Openings | |
| 186 | Channel | |
| 188 | Positioner | |
| 190 | Dispersion Tube | |
| 192 | Arcuate Nozzle | |
| 194 | Arrow | |
| 196 | Outline | |
| 198 | Arrow | |
| 200 | Air Dispersion Device | |
| 202 | Tubes | |
| 204 | | |
| 206 | Cooling Plate | |
| 208 | Threaded Mount | |
| 210 | | |
| 212 | Channel | |
| 214 | Cooling Tube | |
| 216 | | |
| 218 | Opening | |
| 220 | Arrow | |
| 222 | | |
| 224 | | |
| 226 | | |
| 228 | | |
| 230 | | |
| 232 | | |
| 234 | | |
| 236 | | |
| 238 | | |
| 240 | | |
| 242 | | |
| 244 | | |
| 246 | | |
| 248 | | |
| 250 | | |
| 252 | | |
| 254 | | |
| 256 | | |
| 258 | | |
| 260 | | |

DETAILED DESCRIPTION OF THE PREFERRED EMBODIMENTS

The invention will now be described with reference to the accompanying Figures.

As more fully described in U.S. Pat. No. 6,171,541 and schematically illustrated in FIG. 1, an injection-molding machine includes a stationary mold plate 32 having an array of mold cavities 34 and a movable mold plate 36 having an array of mold cores 38. The mold cavity plate 32 is in fluid communication with a manifold plate (not shown) that receives molten material from an injection unit (not shown) of the injection-molding machine. The mold cavities 34 receive the molten material from a melt distribution device, such as, for example, a valve gated nozzle (not shown), through mold cavity gates 40. The mold cavities 34 are each surrounded by cooling means 42 for cooling the molten material in the cavity space formed by the mold core 38 and the mold cavity 34 when the mold plates 32 and 36 are in a mold closed position. The cooling means 42 are preferably formed by cooling channels embedded within the mold plate 32 for conducting a cooling fluid. The mold cores 38 and the mold cavities 34 form, in the mold closed position, a plurality of mold cavity spaces (not shown) that are filled with molten material through the mold gates 40 during the injection step. The mold cores 38 also include means 44 for cooling the molten material in the cavity space. The cooling means 44 preferably comprise a cooling tube within each mold core 38. The mold plate 36 further includes an ejector plate 46, which is used to remove the molded preforms 48 from the mold cores 38. The operation of the ejector plate 46 is well known in the prior art and does not form part of the present invention. In fact, the ejector plate 46 may comprise any suitable ejector plate known in the art.

According to the current invention, any molten plastic, metal or ceramic material can be injected into the mold cavity space and cooled into a desired article using the mold system of FIG. 1. In a preferred embodiment of the current invention, the molten material is PET and the molded article is a preform. Obviously, other forms of molded articles could be cooled by the present invention. According to the present invention, however, the molded article could also be a preform made of more than one material, such as for example virgin PET, recycled PET and an appropriate barrier material such as for example EVOH. It is also obvious that the article might be formed of a different plastic material such as polypropylene or the like.

As is known in the art, a preform is molded by closing the mold, injecting the molten material into the cavity space, initiating cooling of the cavity space, filling the cavity space, holding the molten material under pressure, performing final in-mold cooling, opening the mold, ejecting the semi-solidified articles or preforms from the mold cores and transferring the articles or preforms to a take-off plate. In order to reduce the overall cycle time, the residence time of the preform in the mold has to be minimal so that the mold is able to produce batches of preforms as fast as possible. The problem with a reduced residence time in the mold is that the cooling time has to be reduced, but in such a manner that the molded articles or preforms are solid enough to withstand all the subsequent handling steps without deformation. A reduced cooling time is a problematic option because the articles or preforms are not sufficiently cooled by the cooling means 42 and 44. The amount of heat retained by the article or preform after being cooled inside the mold for a reduced time and immediately after opening the mold is very significant and depends on the thickness of the molded article or preform. This internal heat has the potential to generate crystallized portions at the sprue gate area or dome portion of the molded article or preform, the neck finish portion of the molded article or preform, or the entire preform. In order to prevent the crystallization of the molded article or preform, a very aggressive cooling method has to be used. Also, the heat retained within the preform after it is removed from the mold core 38 may, in some instances, be sufficient to reheat the solid portions of the preform and thereby allow the preform to change shape if not promptly cooled. During cooling, the shrinkage of the molded articles must also be controlled to ensure that the final dimensions of the preform are not adversely affected.

Figure 2:
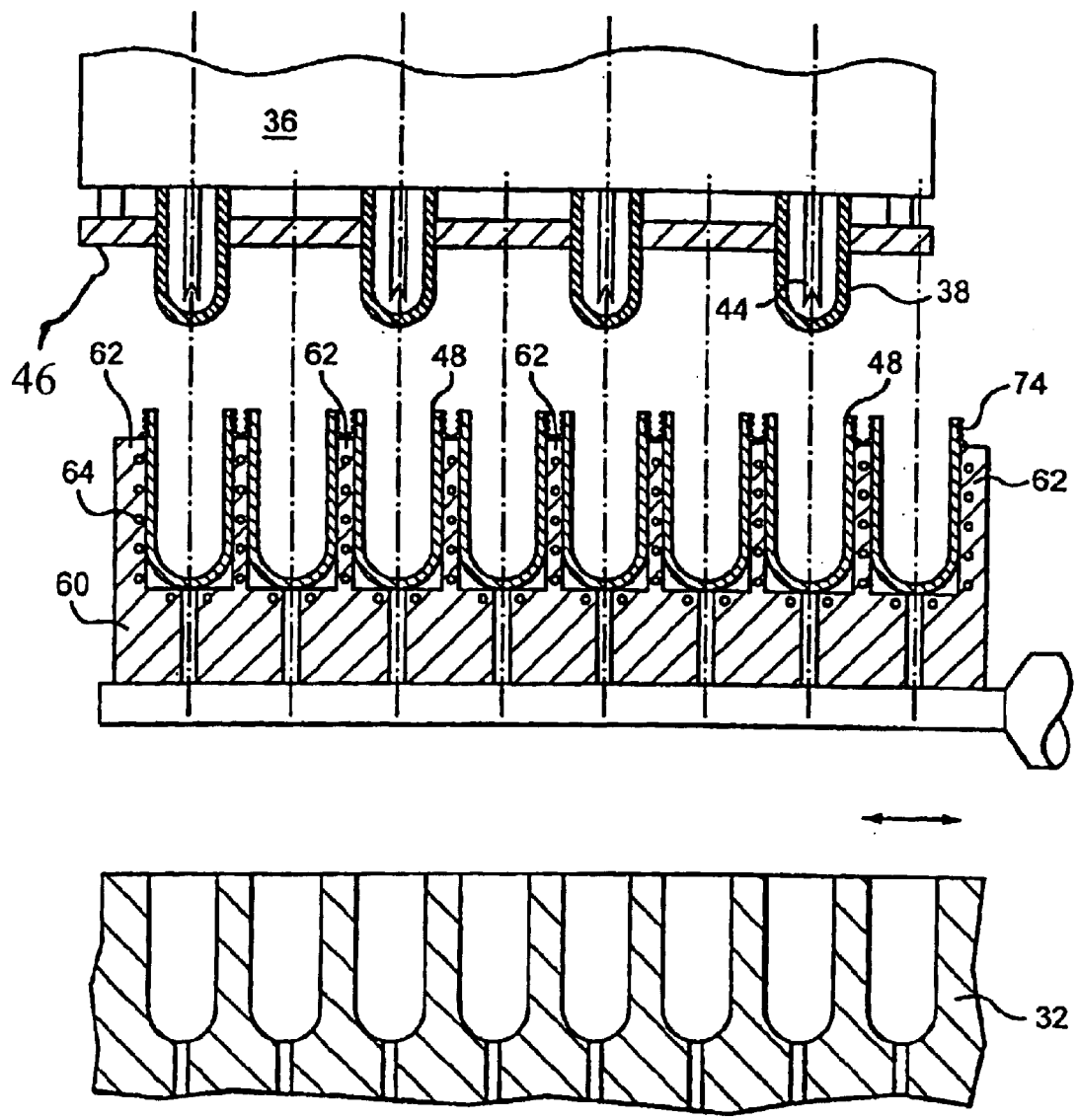
FIG. 2 is a sectional view of a prior art injection-mold showing a movable robot end-of-arm-tool device in the molding area between stationary and movable mold plates.

FIG. 2 illustrates one embodiment of a robot take-off plate 60 that may be used in the cooling method of the present invention. The take-off plate 60 includes a plurality of hollow holders or take-off tubes 62. Hollow tubes 64 within holders 62 may carry cooling water for cooling the preforms 48 when held in the take-off holders 62. Typical take-off plates which may be used for the take-off plate 60 are shown in U.S. Pat. No. 5,447,426 to Gessner et al. and in U.S. Reissue Pat. No. RE 33,237 to Delfer, III, both of which are incorporated by reference herein. In operation, the mouths of a plurality of holders 62 are aligned with the mold cores 38 of the mold plate 36. Transfer of the molded articles or preforms 48 to the holders 62 is effected by operation of the ejector plate 46. As is more fully explained in U.S. Pat. No. 6,171,541, and in accordance with the present invention, the take-off plate 60 can be provided with a number of holders 62 equal to the number of mold cores 38 or a larger number of holders 62 such as a multiple of the number of mold cores 38, for example, three or four times the number of mold cores 38. By having more holders 62 than the number of cores 38, it is possible to retain the molded articles in the holders 62 for longer than a single molding cycle and thereby increase the cooling time in the holders 62 while maintaining a high output of molded preforms 48. The method can be carried out irrespective of the relative number of molded preforms 48 retained by the holders 62. Nevertheless, in the preferred embodiment of the invention, the robot take-off plate 60 has a number of holders 62, which represent three times the number of cores 38. This means that the take-off plate 60 does not always carry a number of preforms or molded articles 48 equal to the number of holders 62. This also means that a single batch of preforms 48 can be moved back more than once into the mold area between the mold plates 32 and 36 to pick up further batches of preforms 48. While being moved back and forth, the preforms 48 are continually cooled by intimate contact between the hollow tubes 64 within the take-off plate 60 and the external wall of the preforms 48, as shown in more detail in the aforementioned U.S. Pat. No. 5,447,426. The tubes 64 carry a cooling liquid such as water. The heat transfer between the tubes 64 and the hot preforms 48 released from the mold core 38 is performed through conduction. More particularly, any solid material incorporating any cooling means can be used and brought into intimate contact with the exterior wall of the preform 48 to cool the molded articles. By using a cooling system based on heat transfer through conduction implemented through an intimate contact between the molded article or preform 48 and the cooling tubes 64, the shape of the article or preform 48 can usually be maintained without deformations or scratches caused by handling. However, as shown in FIG. 2, the neck finish portion 74 of the preforms 48 is not held in intimate contact with the cooling tubes 64 and, therefore, is not directly cooled by the tubes 64. This lack of cooling around the neck finish portion 74 may be a problem. In particular, those preforms having a thick wall neck finish portion 74 relative to the wall thickness of the remainder of the preform are a concern. With this type of preform there may be sufficient heat stored in the neck finish portion 74 to reheat the portion 74 to its softening temperature. If this event occurs, the portion 74 will tend to deform. The present invention mitigates this problem by positively cooling the portion 74 immediately after the preform leaves the molding surface.

U.S. Pat. No. 6,171,541 further provides a cooling plate having a plurality of cooling tubes. A cooling tube extends into the interior of each preform during the time it is held in the holders 62 and the take-off plate 60 is not situated between the mold plates 32 and 36. While this additional cooling mechanism has been very effective in reducing the cycle time required to produce a preform it has been found to have some deficiencies. In the embodiments shown in U.S. Pat. No. 6,171,541, the cooling tubes provide cooling fluid directly onto the interior surface of a tip portion of the preform and provide a cooling path where the cooling fluid flows from the interior tip portion down the interior of the preform towards the neck finish portion where it escapes. With this arrangement, the cooling fluid passing over the neck finish portion of the preform has been heated substantially by the preform before reaching the threaded neck finish portion. Consequently, the cooling tubes provide little cooling to the neck finish portion of the preform. While, with many preforms this is not a concern, since the hottest part of the preform is at the tip, it does become a concern when the walls of the neck portion are thick relative to the walls of the rest of the preform. Preforms having such thick walls in the neck or neck finish portion, retain a significant amount of heat in that portion that is not readily dissipated with the prior art design. Accordingly, it is necessary to provide a mechanism to quickly cool the neck portion of the preform in a controlled manner so that the thread on the preform will retain its dimensional integrity during the post-mold cooling process.

The present invention solves the problem by providing a direct flow of coolant over the exterior surfaces of the neck or neck finish portion of the preform. Surprisingly, the invention works so well that the preform may be cooled quickly and efficiently without the need for the internal cooling provided by the cooling tubes described in U.S. Pat. No. 6,171,541 and, at the same time, improve the productivity of the injection-molding machine. However, there may be some situations where it is desirable to include both cooling processes.

Figure 3:
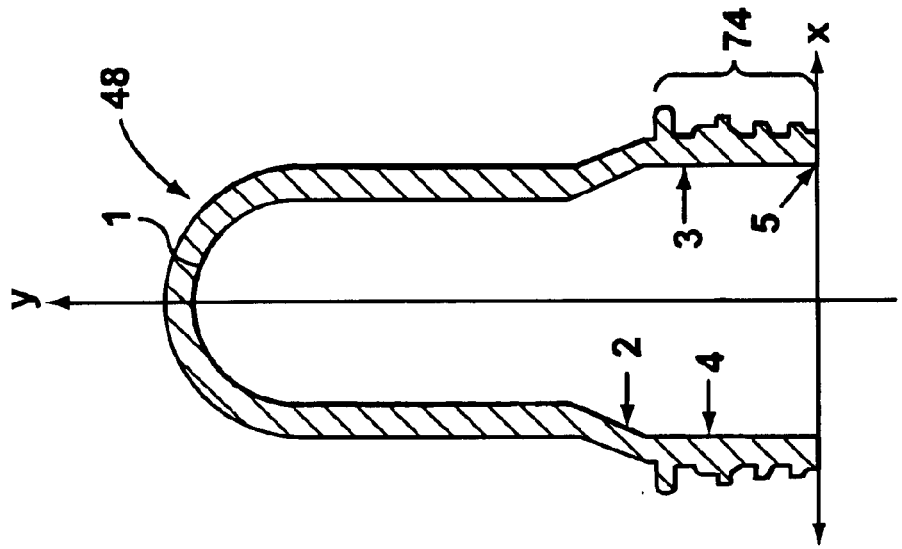
FIG. 3 is a sectional view of a typical preform with a thermal graph of its temperature characteristics after removal from the molding surface.
Figure 3:
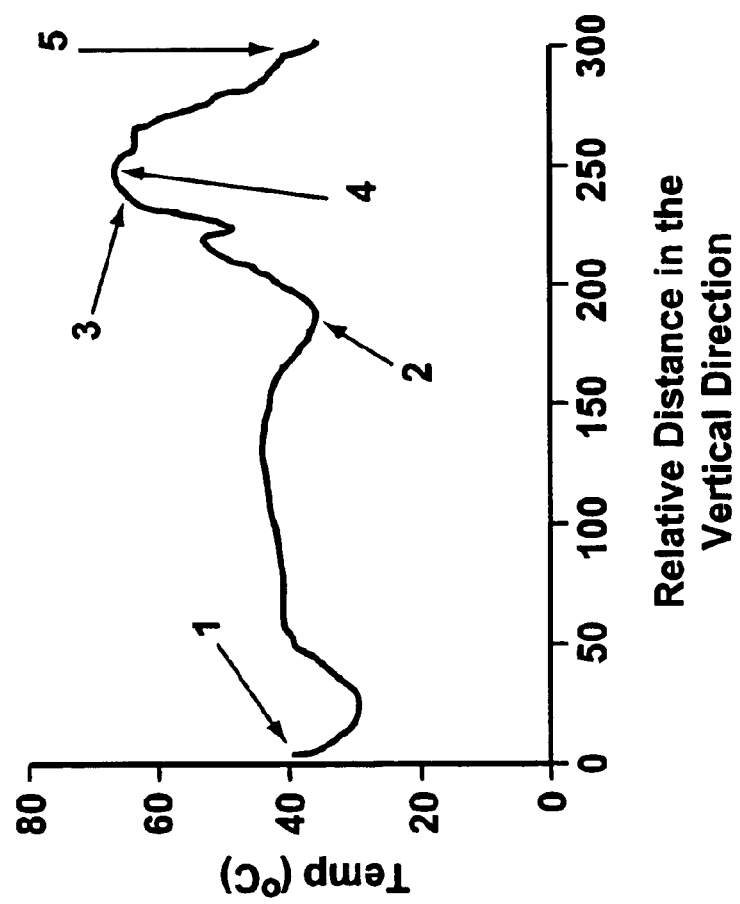

An example of a typical temperature profile of a preform 48 having a relatively thick neck finish portion 74 when removed from the mold cavity is shown in FIG. 3. As shown therein the gate 1 and region 2 are cool relative to the local thin section 3 and local thick section 4 in the neck finish portion 74. This illustrates that most of the heat held in the preform 48, immediately upon transfer out of the mold, is held in the relatively thick neck finish portion 74 of the preform 48. The rapid and uniform cooling of this thread neck portion 74 will permit the removal of the preform from the take-off plate at the earliest point of the cycle. Because the heat in the preform is not distributed evenly across the width of the wall of the preform and, in fact, the central portion of the wall may be significantly hotter than the surface portions of the preform, the heat from the central portion of the walls dissipates through the external surfaces of the preform. In some cases, this can cause the outer surfaces of the walls of the preform to reheat to a point where they lose their rigidity. If this happens, the integrity of the preform surface will be lost. As most of the heat is held in the thicker thread neck finish portion 74, cooling means must be provided to prevent the internal heat in the walls of the thread neck finish portion 74 from heating the external wall surfaces to a softening temperature. The present invention provides direct cooling of the thread neck finish portion 74 SO that the internal heat is dissipated without overheating the outer surfaces of the preform.

Figure 4:
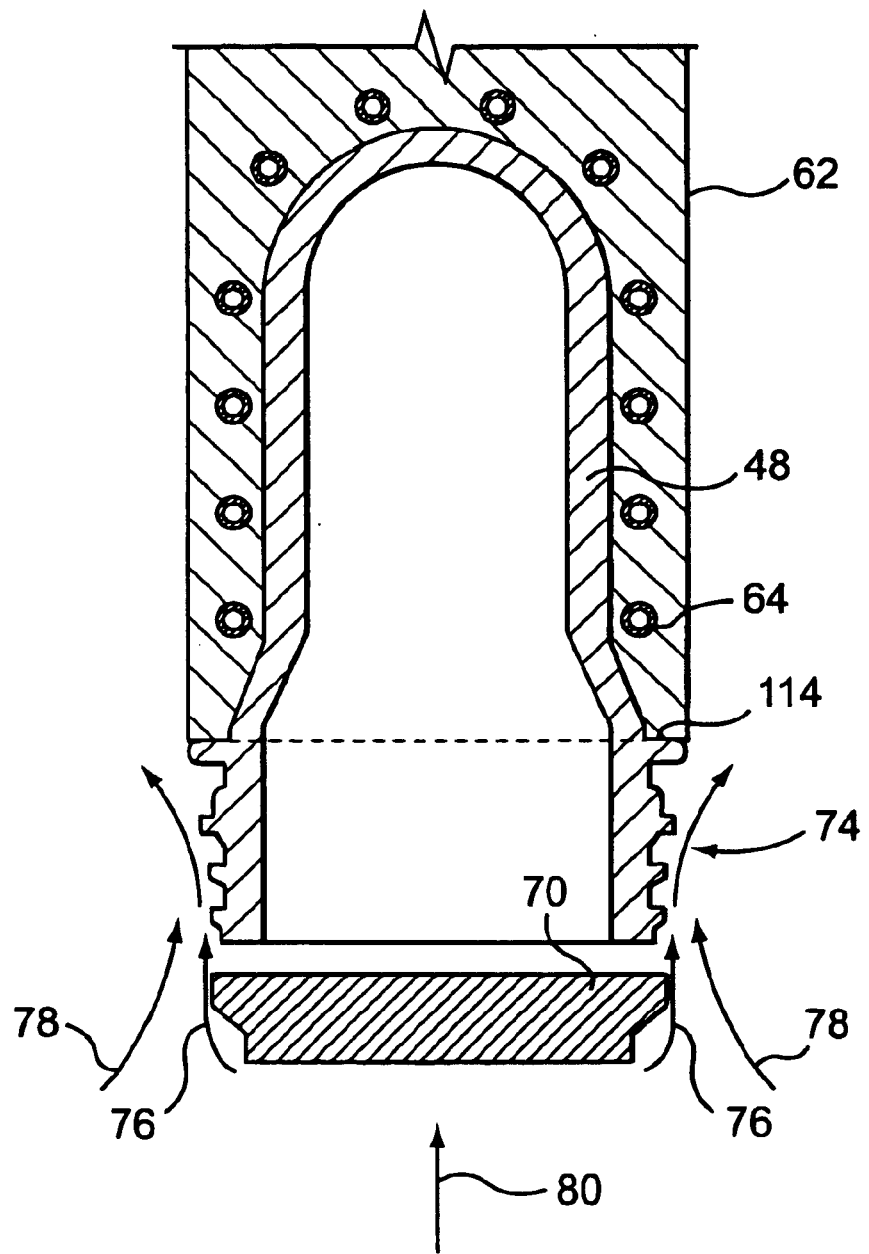
FIG. 4 is a cross-sectional view of a preform held in a take-off plate when being cooled in accordance with a first embodiment of the present invention.

The basic concept of the invention is schematically illustrated in FIG. 4. As shown in FIG. 4, a preform 48 is held in a take-off holder 62 that is mounted in a take-off plate (not shown). The take-off holder 62 may include hollow cooling tubes 64. The invention provides a deflecting plate or insert 70 for deflecting pressurized air away from the internal surfaces of preform 48 and towards the external neck finish portion 74 of the preform 48. While not shown in FIG. 41 some form of confining wall around the exterior of the neck finish portion 74 of the preform 48 may be provided. The manner in which the air can be channeled efficiently will be discussed hereinafter. In the embodiment shown in FIG. 4, the pressurized air flow 76 will draw a quantity of ambient air 78 along with it to thereby enhance the cooling effect.

Figure 10:
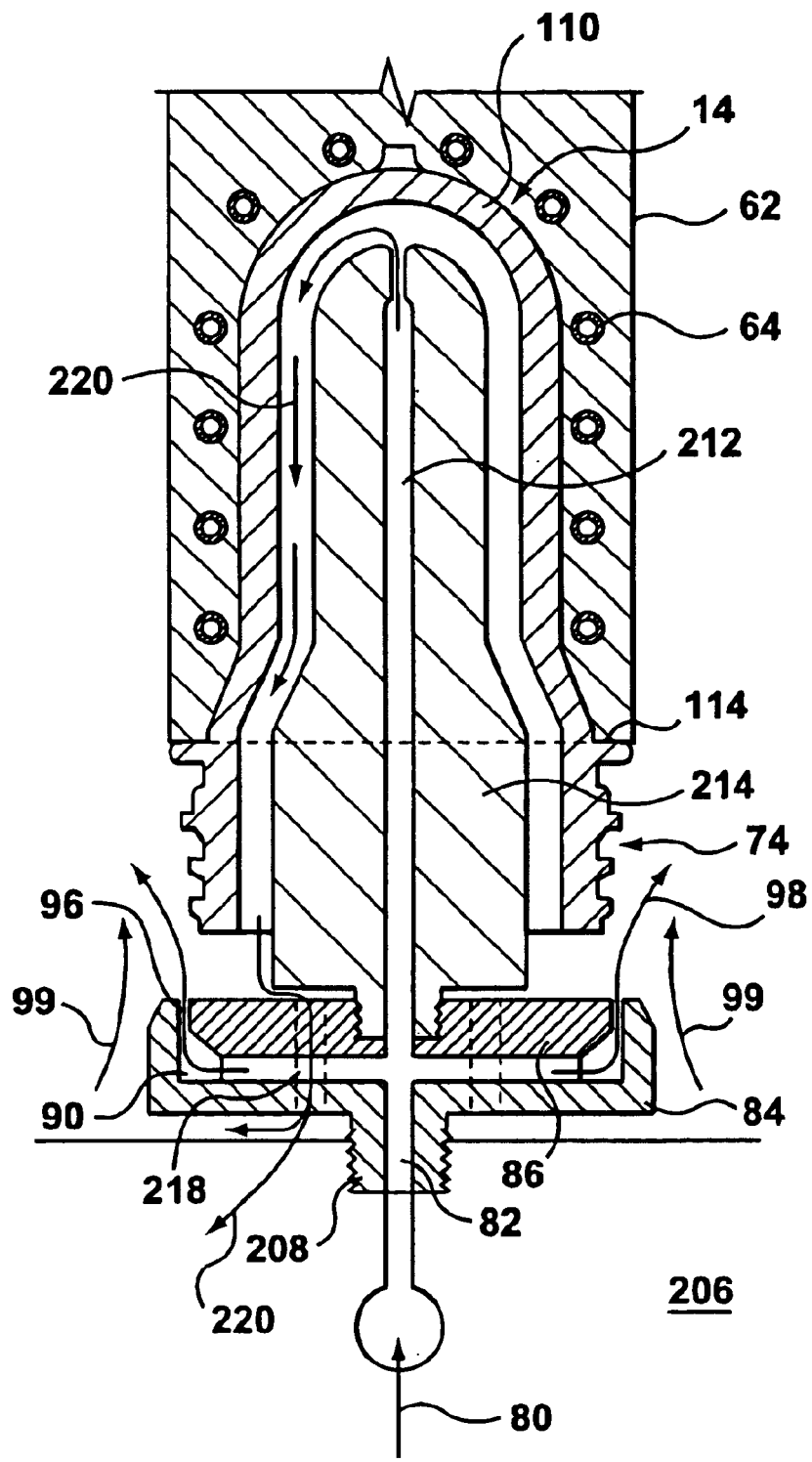
FIG. 10 is a cross-sectional view of a further embodiment of the present invention.

It should be noted that with the design shown in FIG. 4, the neck finish portion 74 of the preform 48 is entirely cooled from the exterior inwardly. The intimate contact between the preform 48 and the take-off holder 62 provides cooling to the top body of the preform 48 through the cooling tubes 64. The pressurized air flow 76 provides cooling to the exterior of the neck finish portion 74 of the preform 48. For most preforms having a thick neck finish portion, this combination of cooling may be sufficient. The neck finish portion 74 must be stable before the preform 48 can be removed from the take-off plate 60. However, in cases where the preform neck finish portion 74 is thinner, it may be useful to add additional cooling of the preform through the use of cooling tubes on a cooling plate as is more fully described in U.S. Pat. No. 6,171,541. An embodiment of the invention that uses both forms of cooling is shown in FIG. 10 and will be described hereinafter.

In any event, the challenge is to combine all these forms of cooling to ensure that the preform is cooled in the shortest possible cycle time so that the preform can be removed from the take-off plate 60 in the shortest time without creating any deformities in the finished preform.

Figure 5:
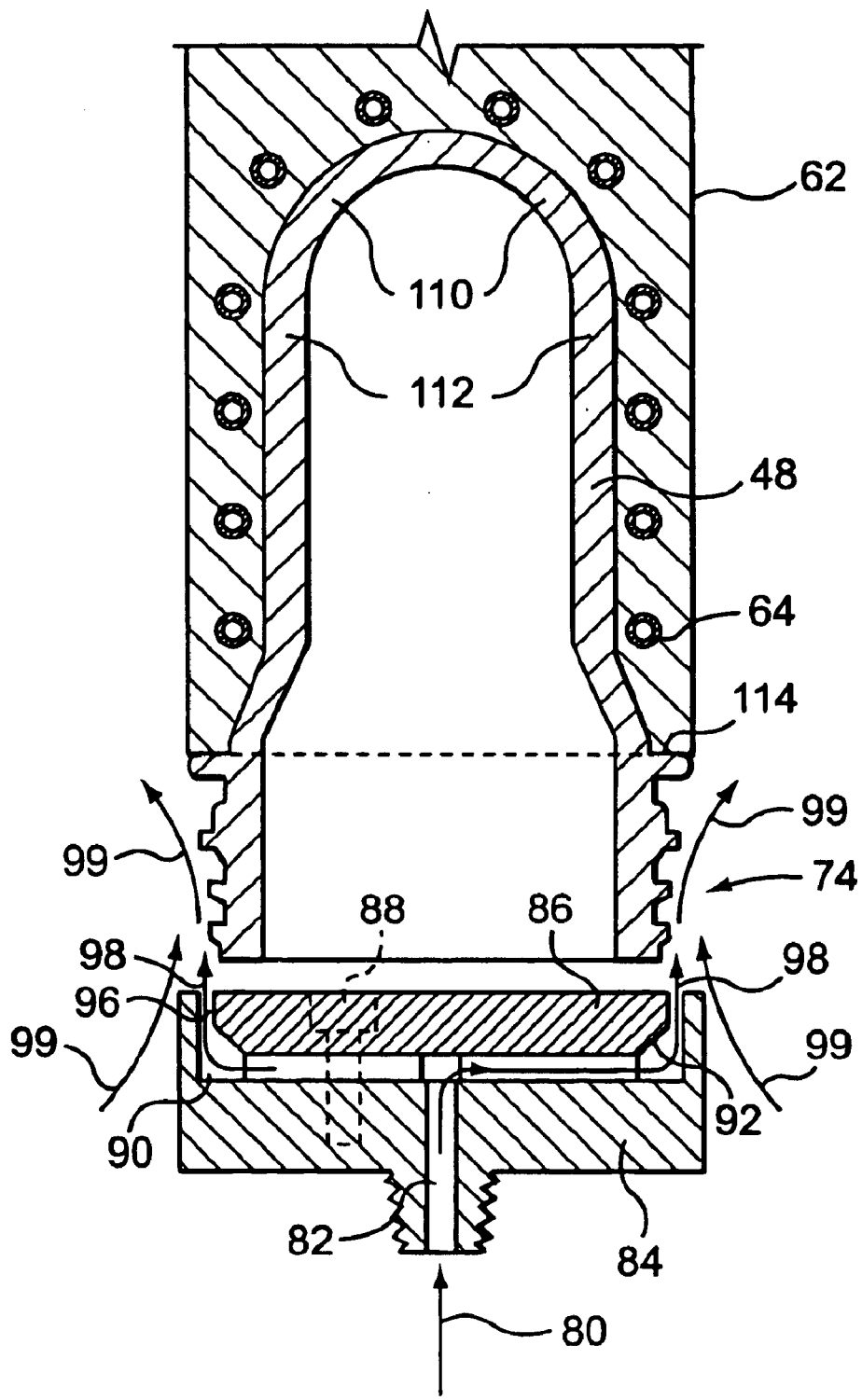
FIG. 5 is a cross-sectional view of a preform being cooled in accordance with a further embodiment of the invention.

FIG. 5 illustrates a further embodiment of the invention that cools the preform efficiently. In this embodiment, a source of pressurized air 80 is directed into an air channel 82 in a base plate 84. An insert 86 is mounted on the base plate 84 by any suitable means. In the present embodiment, bolts 88 (only one shown) align and hold the insert 86 to the base plate 84. The circumferential surface 92 of the insert 86 is machined to create an air manifold in the space 90 between the insert 86 and the base plate 84. The air manifold ensures uniform distribution of the pressurized air 80 through the gap 96 in the path shown by arrows 98 to blow over the neck finish portion 74 of the preform 48. The air in the path shown by arrows 98 entrains ambient air along the path indicated by arrows 99 to thereby increase the cooling efficiency over the neck finish portion 74. This can mean a substantial reduction in the amount of pressurized air needed to cool the preform 48 thereby increasing the efficient use of cooling air.

As shown in FIG. 5, the cooling tubes 64 provide cooling to the dome 110 and body 112 of the preform 48. The support ledge 114 experiences cooling both from the cooling air shown by the arrows 98 and 99 and the cooling tubes 64 through contact with the holder 62. With this combination of the cooling tubes 64 and the cooling pressurized air 80 and the drawn in ambient cooling air the entire preform 48 can be quickly cooled so that the time the preform must remain in the holder 62 can be minimized.

Figure 6A:
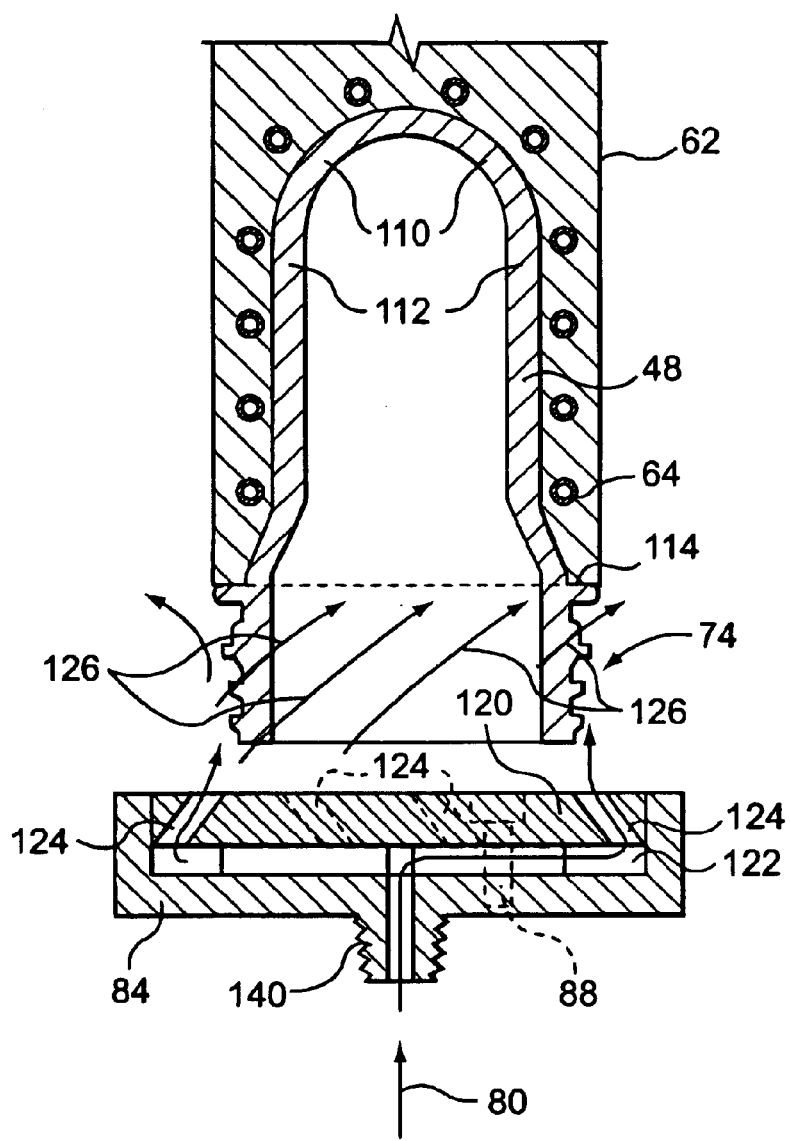
FIG. 6A is a cross-sectional view of a further embodiment for cooling the preform.
Figure 6B:
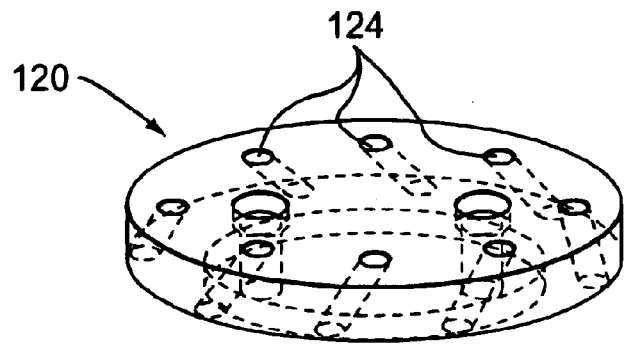
FIG. 6B is a perspective view of the insert used in cooling the preform in the embodiment shown in FIG. 6A.

A further embodiment of the invention is shown schematically in FIGS. 6A and 6B. In this embodiment, an insert 120 is provided. The insert 120 is channeled to provide cooling pressurized air 80 to the neck finish portion 74 of the preform 48 in a swirling vortex that cools the thread portion 74 of the preform 48.

As shown in FIGS. 6A and 6B, a base plate 84 is attached to a cooling plate (not shown) through a thread mount 140 or the like. The insert 120 is attached to the base plate 84 by bolts 88 (only one shown) but any suitable means of attachment could be used. A chamber 122 is created between the base plate 84 and the insert 120. The chamber 122 distributes cooling air through angled openings 124 in the insert 120. The openings 124 are directed towards the outer surface of the preform 48 at an angle to the major axis of the preform 48.

In operation, air is blown directly onto the outer surface of the neck finish portion 74. The air adheres to the neck finish portion 74 by blowing the air somewhat tangentially to the surface of the thread portion. The air leaving the insert 120 in the direction of the arrows 126 creates a stable vortex around the full length of neck finish portion 74 and finally breaks up at the support ledge 114. The pressurized air 80 draws in ambient cooling air as was the case with embodiments of the invention described hereinbefore. Optionally, the sidewalls of plate 84 could be extended upwardly to create a cup-like structure around the neck finish portion 74 so as to further confine the vortex flow around the neck finish portion 74.

Figure 7A:
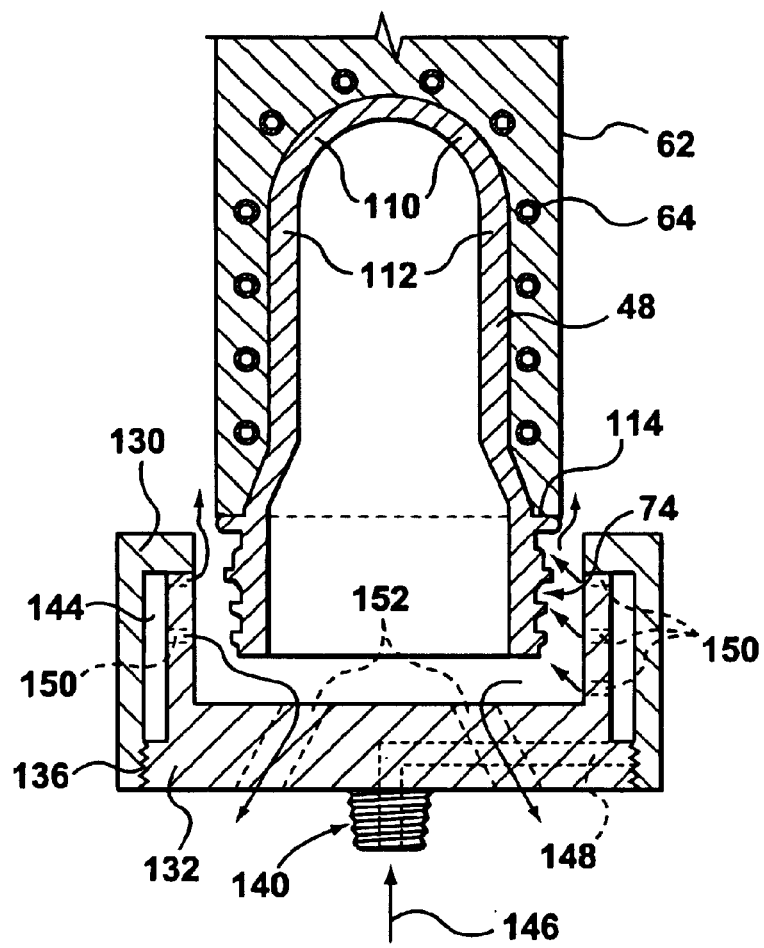
FIG. 7A is a cross-sectional view of a further embodiment for cooling the preform.
Figure 7B:
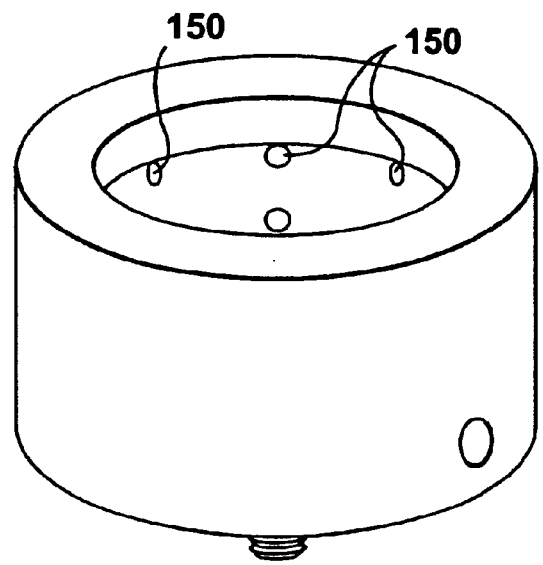
FIG. 7B is a perspective view of the insert used in the embodiment shown in FIG. 7A.

FIGS. 7A and 7B show a further embodiment of the invention. Cooling tubes 64 are provided within the take-off holder 62. The invention may be used with or without the cooling tubes in the take-off plate depending upon the cooling performance desired and the actual characteristics of the preform to be cooled.

In this embodiment, a sleeve 130 is attached to a base plate 132. As shown in FIG. 7A, the sleeve 130 is threadedly attached to the base plate 132 by threads 136, but any suitable mounting means could be used.

It should be noted that the base plate 132 is attached to a cooling plate that provides a source of cooling medium such as air to the base plate 132. As shown in FIG. 7A, the threaded mount 140 would attach the base plate 132 to a cooling plate. Of course, a plurality of preforms 48 are simultaneously cooled and each preform being so cooled requires its own cooling base plate 132 attached to the cooling plate. The number of cooling stations on the cooling plate would be determined by the number of take-off positions provided on the take-off plate.

A chamber 144 is created between the sleeve 130 and the base plate 132 to receive pressurized air from a supply line 146. The pressurized air enters the chamber 144 through a line 148.

Openings 150 in the sleeve 130 release the pressurized air onto the surface of the threaded neck finish portion 74 of the preform 48. The warming air rapidly escapes from the cooling area through discharge openings 152 in the base plate 132 and around the opening between the ledge 114 and the sleeve 130.

The openings 150 may be disposed to direct the cooling air stream straight onto the threaded neck finish portion 74 or they may be angled to create a circular motion of the air stream around the threaded neck finish portion 74. In either case, the sleeve 130 should be designed to provide an even stream of cooling air over the entire threaded neck finish portion 74 so that the entire threaded neck finish portion 74 is cooled.

Figure 8A:
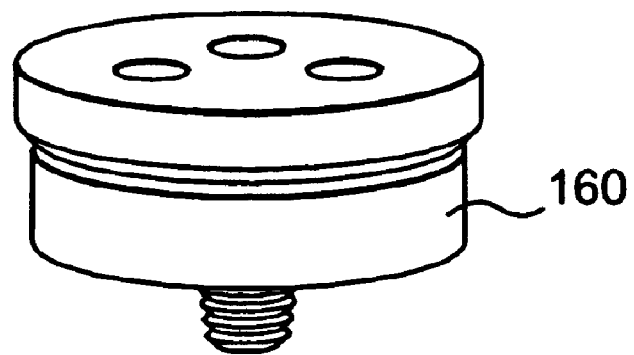
FIG. 8A is a perspective view and FIG. 8B is a cross-sectional view of a further embodiment of the cooling device of the present invention.
Figure 8B:
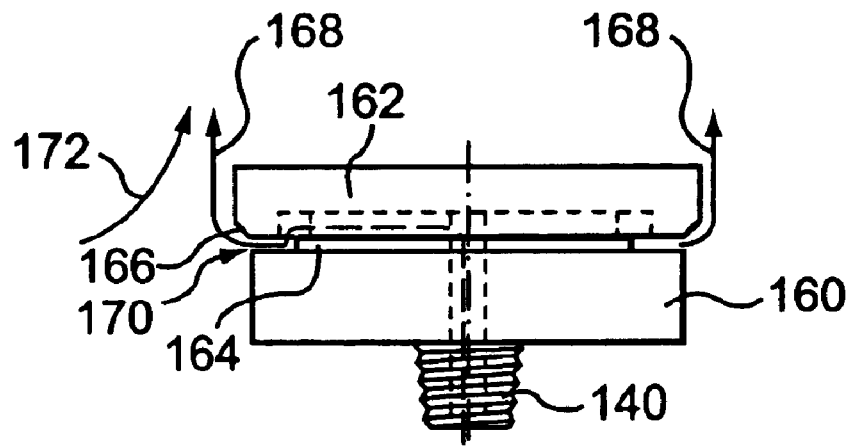

FIGS. 8A and 8B illustrate a further embodiment of the invention. In this embodiment, the base plate 160 would be attached to a cooling plate by the threaded mount 140. Pressurized coolant flows through the threaded mount 140 to a channel in the insert 162. A gap 164 between the insert 162 and the base plate 160 is sized so as to control the distribution of pressurized air. The gap 164 is shaped to create streams of coolant out through the space 170 between the plate 160 and the insert 162. The circumferential area 166 on the insert 162 is chamfered to cause the air expelled through the space 170 between the plate 160 and the insert 162 to travel in a path shown by the arrows 168. This draws a large amount of ambient air 172 along with it so as to quickly cool a preform that would be located directly above the insert 162.

Figure 9A:
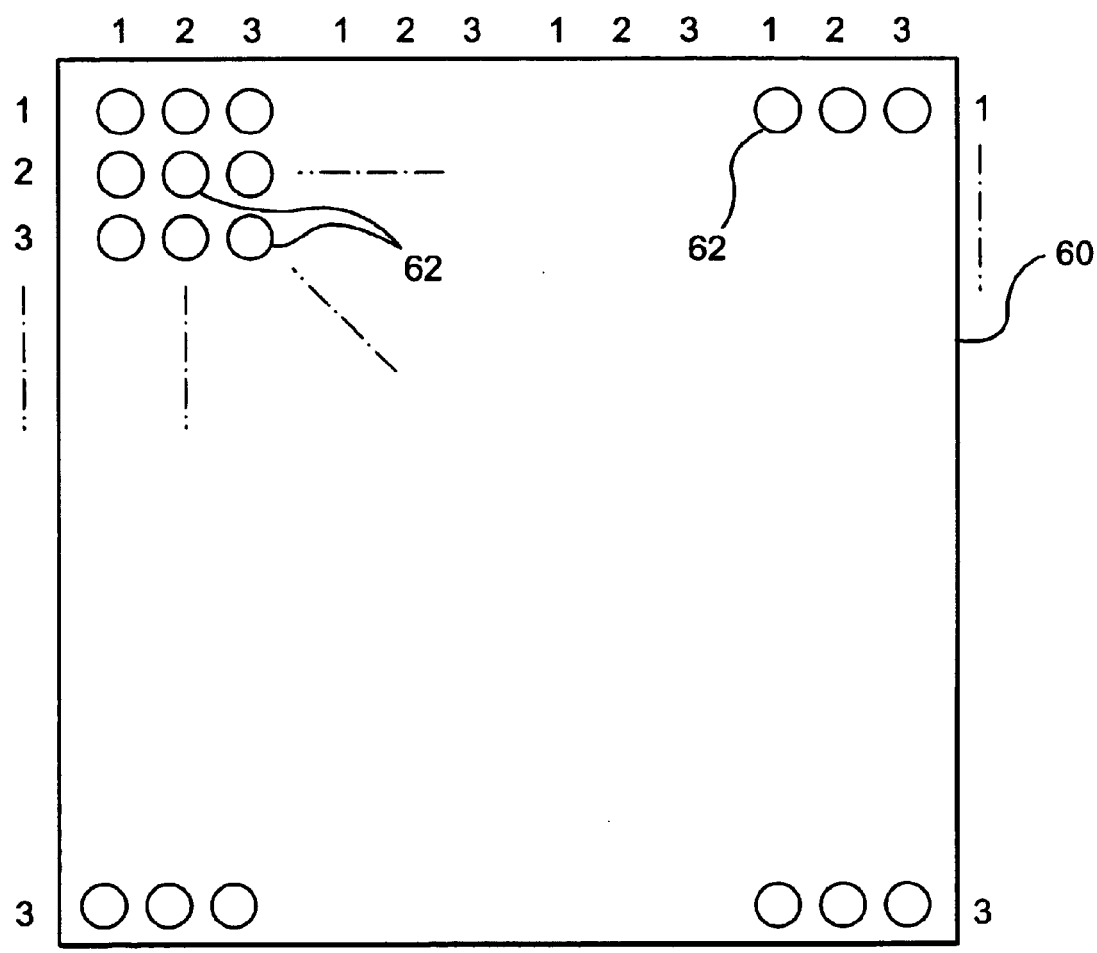
FIG. 9A is a partial plan view of a prior art preform take-off plate.

In a further embodiment of the invention the cooling mechanism for the neck finish portion of the preform may be provided as an integral part of the take-off plate 60. FIG. 9A is a schematic plan view of a well-known take-off plate 60 such as is described in US Reissue Patent 33,237. The take-off plate 60 has three groups of take-off tubes or holders 62 for receiving three groups of preforms. As more fully described in the earlier U.S. Reissue Pat. No. 33,237, each group of holders 62 receives a set of preforms in one of three cycles of the take-off plate movement into an open mold and discharges its set of preforms to a conveyor or the like once every three cycles. In this way the preforms can be held on the take-off plate 60 for three molding cycles and can be fully cooled before discharge to a conveyor. This sequence of operations is not a part of the present invention and will not be more fully described herein. In fact, other holding devices could be used in the implementation of the present invention as will become evident from the following description.

Figure 9B:
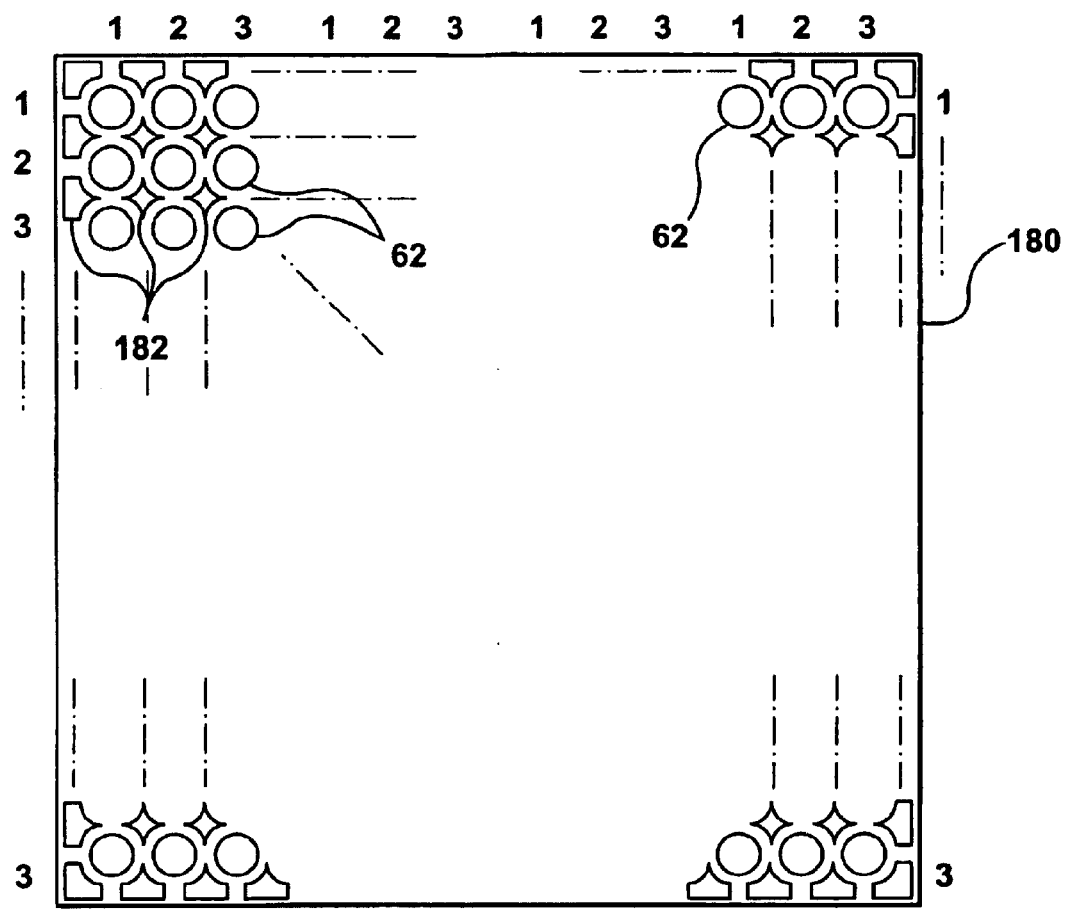
FIG. 9B is a partial plan view of a prior art preform take-off plate when modified in accordance with the teachings of the present invention.

FIG. 9B is a schematic plan view of the modified take-off plate incorporating the present invention. The take-off plate 180 includes the three sets of take-off tubes 62 for receiving and holding the preforms as before. The additional feature is the addition of coolant dispersion devices 182 which surround each take-off holder 62 and disperse a coolant such as cool air around the neck or neck finish portion of a preform held in the holder 62.

Figure 9C:
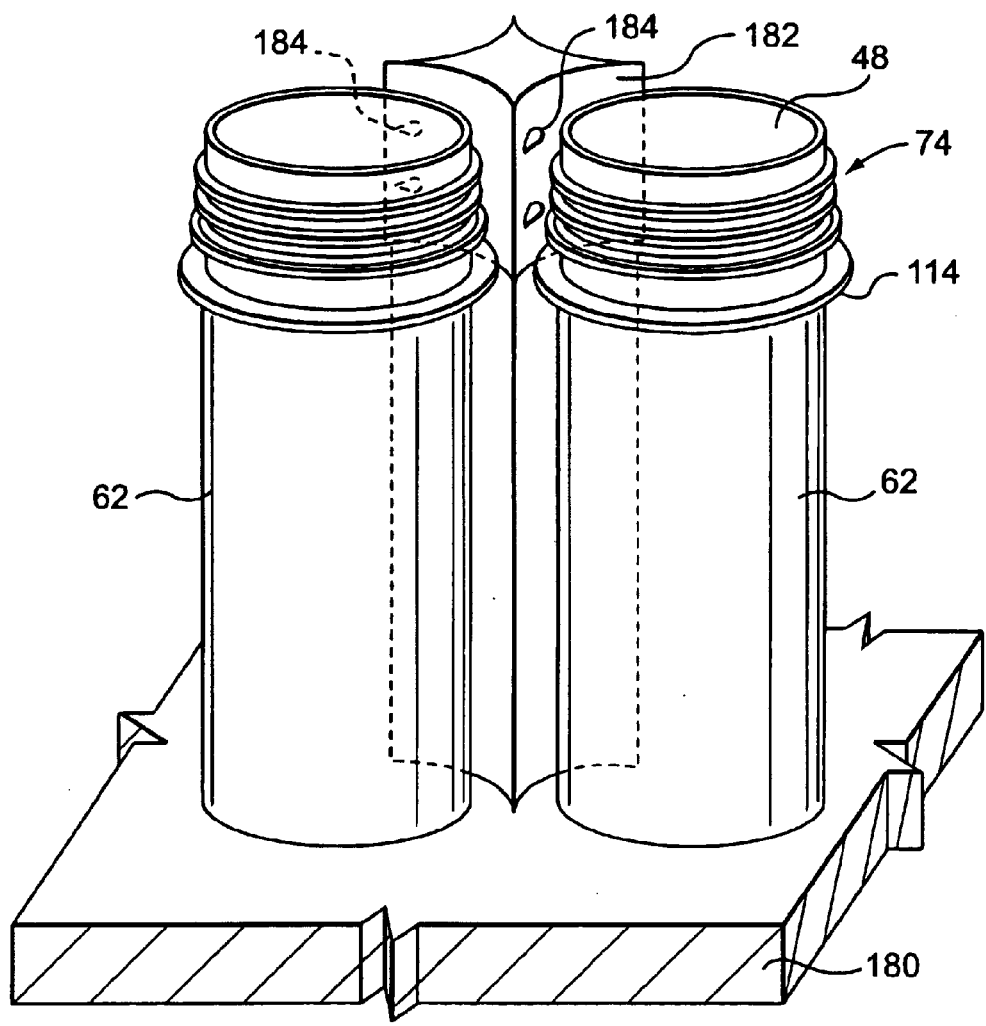
FIG. 9C is a perspective view of a portion of the modified take-off plate illustrated in FIG. 9B.

FIG. 9C illustrates schematically one form of dispersion device. The holders 62 hold preforms 48. Supporting ledges 114 on preforms 48 rest on the top of the holders 62. Dispersion device 182 extends upwardly from the base of the take-off plate 180 and includes coolant outlet openings 184 which discharge coolant around the periphery of the neck finish portion 74 of the preform 48.

Figure 9D:
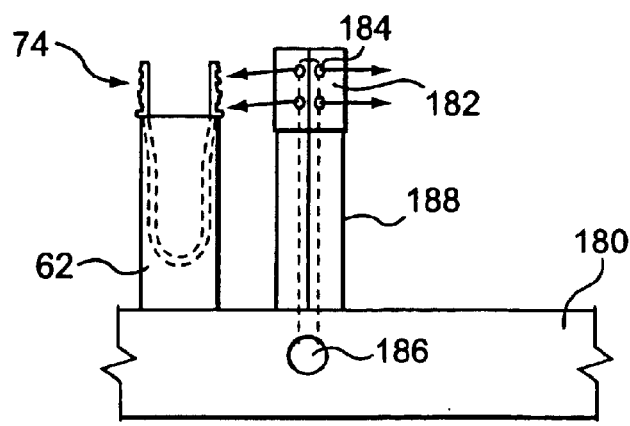
FIG. 9D is a schematic elevational view of the air dispersion device on the take-off plate of FIG. 9B.

FIG. 9D schematically illustrates the position of the dispersion device with only a single take-off holder 62 shown. The dispersion device 182 is mounted on the take-off plate 180. Channel 186 in take-off plate 180 provides coolant to the dispersion device 182. A positioner section 188 positions the dispersion device 182 to ensure that the openings 184 are properly positioned relative to the neck finish portion 74.

Figure 9E:
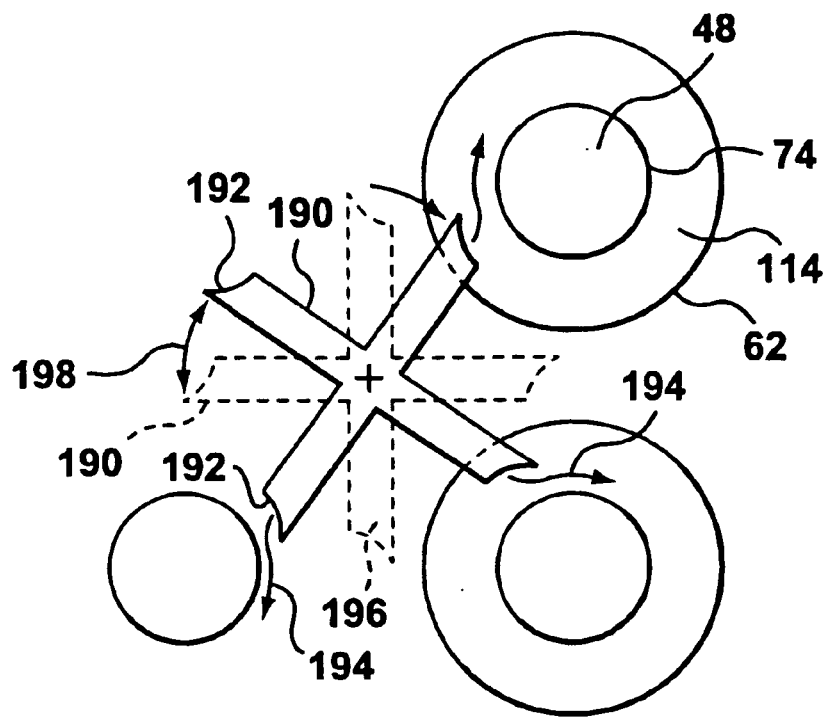
FIGS. 9E and 9F are illustrations of two alternative forms of the air dispersion device shown schematically in FIG. 9D.
Figure 9F:
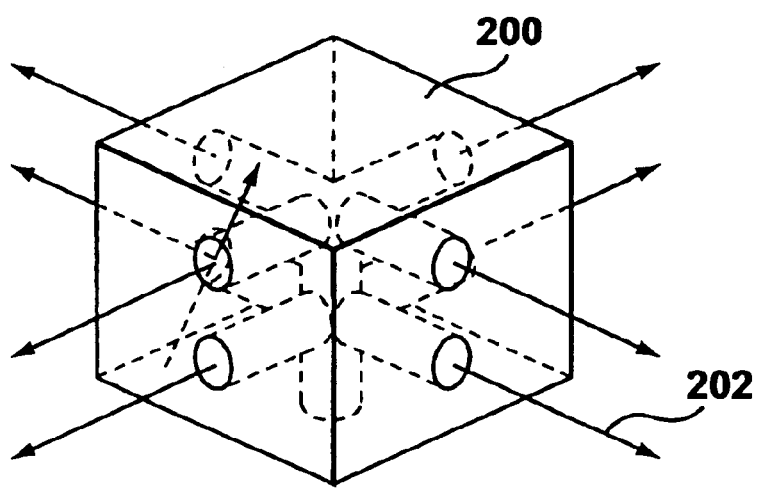

FIGS. 9E and 9F illustrate two further embodiments of air dispersion devices.

As shown in FIG. 9E, a plurality of dispersion tubes 190 receive cooling air through a central passageway and distribute it over the neck finish portion 74 of the preforms 48 through arcuate nozzles 192 as shown by arrows 194. The arcuate nozzles 192 create an air flow around the neck finish portions 74 of the preforms 48. The preforms may be held within take-off holders 62 by vacuum in a manner well-known in the art. Support ledges 114 of preforms 48 rest on the top surface of the take-off holders 62.

The dispersion tubes 190 may be maintained in a remote position when the holders 62 are being loaded with preforms 48 and subsequently rotated into operative position adjacent a preform 48 only after a preform 48 is transferred from the mold cavity to the associated take-off holder 62. This operation will ensure that the dispersion tubes 190 do not interfere with the transfer of the preforms into and out of the holders 62. The rest position of the dispersion tubes 190 is shown in outline at 196 in FIG. 9E and arrow 198 indicates the rotational movement of dispersion tubes 190 between its operative and rest positions. Alternatively, the dispersion tubes 190 could be raised and lowered to move them into and out of their operative and rest positions.

As shown in FIG. 9F, an alternative air dispersion device 200 has tubes 202 that direct the cooling air onto the neck finish portion 74 of the preforms 48. The tubes 202 are shown directing air toward the neck finish portion 74 at a right angle to that surface. Obviously, the tubes 202 could be angled so as to provide any desired direction of fluid flow over the neck finish portion 74 of a preform 48.

FIG. 10 shows a further embodiment of the invention which combines the cooling effects of cooling tubes directing cooling fluid directly onto the interior tip of a preform and onto the exterior surface of the neck finish portion of the preform. For ease of understanding, elements similar to those shown in FIG. 5 are designated by the same reference characters.

In this embodiment, preform 14 is held in holder 62 with ledge 114 resting on the top surface of holder 62. Holder 62 may include cooling tubes 64. It should be understood that one may select any or all means of cooling the preform so as to best cool the preform efficiently without damage.

As with the embodiment shown in FIG. 5, pressurized air 80 is provided to air channel 82 where it is permitted to flow into space 90 and through gap 96 between insert 86 and base 84. Base 84 is attached to a cooling plate 206 through a threaded mount 208. The pressurized air 80 flows in the direction of arrows 98 to thereby cool the neck finish portion 74 of preform 14 in the same manner as described with reference to the embodiment shown in FIG. 5. The difference in this embodiment is that the pressurized air 80 also travels through channel 212 in cooling tube 214 to where it is discharged against the interior surface of the dome 110 of the preform 14 and flows past the interior surface of the preform 14 and is discharged through openings 218 in insert 86 and base 84 as indicated by the path illustrated by arrows 220.

With the arrangement shown in FIG. 10, the interior surface of preform 14 is cooled by the flow of air through tube 212 simultaneously with the cooling of the exterior surface of the neck finish portion 74.

It is to be understood by persons skilled in the art that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A post mold cooling apparatus for post mold cooling a molded article threads, comprising:

an entry port for receiving a supply of coolant;

a director; and an exit port for discharging said coolant;

said director receiving said supply of coolant from said entry port and delivering said coolant to said exit port, said exit port discharging said coolant onto an outer exposed surface portion of the threads of said molded article, said director directing the coolant in a direction which is substantially non-perpendicular to the longitudinal axis of the molded article;

whereby said coolant cools said outer surface portion.

2. A post mold cooling apparatus for post mold cooling a molded article having threads at an open end thereof, comprising:

an entry port for receiving a supply of coolant;

a director; and an exit port for discharging said coolant;

said director receiving said supply of coolant from said entry port and delivering said coolant to said exit port, said exit port providing focused release of said coolant about an exposed outer surface portion of the threads of said molded article, said director directing the coolant in a direction which is substantially non-parallel to a plane of the opening of the molded article;

whereby said coolant cools said outer surface portion.

3. A post mold cooling apparatus for post mold cooling of a molded article having a body portion and a neck portion, comprising:

structure for conduction-cooling an outer surface of the body portion of the molded article;

a base having an entry port for receiving a supply of coolant; and an insert;

said base having a distributor for receiving said supply of coolant and for providing said supply of coolant to said insert;

said insert discharging said coolant onto an exposed outer surface portion of the neck portion of said molded article while said structure conduction-cools the outer surface of the body of the molded article.

4. A post mold cooling apparatus for post mold cooling of a molded article having an opening and a tip, comprising:

a base having an entry port for receiving a supply of coolant; and an insert;

said base having a distributor for receiving said supply of coolant and for providing said supply of coolant to said insert;

said insert directing said coolant in a direction from the opening of the molded article toward the tip thereof, for focused release of said coolant about an exposed outer surface portion of the opening of said molded article.

5. A post mold cooling apparatus for post mold cooling of a molded article having threads, comprising:

a base having an entry port for receiving a supply of coolant; and an insert;

said base having a distributor for receiving said supply of coolant and for providing said supply of coolant to said insert;

said insert directing said coolant for controlled distribution of said coolant about an exposed outer surface portion of said molded article, said insert directing at least two streams of coolant to corresponding outer surface locations on the threads of the molded article.

6. A post mold cooling apparatus as defined in any one of claim 1, 2, 3, 4 or 5 wherein said exposed outer surface comprises a neck finish portion of a preform.

7. A post mold cooling apparatus as defined in claim 3, claim 4 or claim 5 further including a cooling tube mounted on said insert, said cooling tube extending into an interior surface of said molded article when said outer surface of said neck finish portion is exposed to said coolant, said cooling tube including an open channel communicating with an opening in said insert to provide said coolant to said interior surface.

8. A molded article cooling device for cooling an external surface of a molded article, said device comprising:
- a cup-shaped structure having (i) a channel for receiving pressurized coolant, and (ii) inwardly facing exit ports for discharging said pressurized coolant onto said external surface when said external surface is confined within said cup-shaped structure, said coolant being directed by said ports so as to swirl about said external surface in a direction from an opening of the molded article toward a tip thereof.

9. A molded article cooling device for directing cooling fluid onto an external surface of a neck portion of a molded article, said device comprising:
- a cup-shaped structure;
- a channel within said structure for receiving coolant, and
- a plurality of exit ports in said cup-shaped structure, for discharging said coolant onto a corresponding plurality of locations of said external surface of the neck portion of a molded article when said external surface is confined within said cup-shaped structure.

10. A molded article cooling device as defined in claim 9 wherein said external surface comprises an outer surface of a threaded portion of said molded article.

11. A molded article cooling device as defined in claim 9 or claim 10 wherein said exit ports comprise a plurality of columns situated around a periphery of said external surface.

12. A molded article cooling device as defined in claim 9 or claim 10 wherein said exit ports are disposed to discharge said coolant onto said external surface at an acute angle to said surface.

13. A molded article cooling device as defined in claim 9 or claim 10 wherein said cup-shaped structure includes discharge channels in a base portion of said cup-like structure to discharge expended coolant from said structure.

14. A molded article cooling device for cooling a molded article comprising:
- a base portion having a cup-like structure;
- an insert portion mounted within said cup-like structure;
- a channel within said base and insert portions for receiving a pressurized coolant from a source of pressurized coolant; and
- a circumferential nozzle gap between said insert portion and said base portion, said gap being defined by a tapered surface on said insert portion and said cup-shaped structure so as to cause said coolant being discharged through said gap to draw ambient coolant into a cooling path across an external neck finish portion of a molded article held in a mold take-off plate.

15. A molded article cooling device for cooling as defined in claim 14 wherein said nozzle gap comprises a venturi nozzle gap.

16. A molded article cooling plate for a molded article molding machine, said plate including;
- a plurality of molded article holding tubes;
- a coolant distributor adjacent each said molded article holding tube;
- a channel in said cooling plate, said channel including a channel opening into each said distributor, said channel providing coolant to each said distributor; and
- exit ports on each said distributor, said exit ports being located above and adjacent to said holding tubes so as to provide coolant to an external portion of the molded article held in said tubes.

17. A molded article cooling plate as defined in claim 16 wherein said coolant is supplied as a pressurized coolant.

18. A molded article fluid amplifying device comprising;
- a base portion for receiving a flow of pressurized fluid;
- a cap portion mounted on said base portion, said cap portion having an internal channel for receiving said pressurized fluid; and
- a circumferential interface between said base portion and said cap portion, said interface defining a circumferential nozzle, said cap portion having a tapered surface at said interface, said tapered surface creating movement of said pressurized fluid along a periphery of said cap portion in an axial direction so as to draw fluid from an ambient environment along with said pressurized fluid.

19. A molded article fluid amplifying device as defined in claim 18 wherein said fluid comprises a coolant.

20. A molded article fluid amplifying device as defined in claim 18 or claim 19 wherein said nozzle comprises a venturi nozzle.

21. A molded article fluid amplifying device as defined in claim 18 or claim 19 wherein said fluid comprises a gas.

22. A molded article fluid amplifying device as defined in claim 18 or claim 19 wherein said fluid comprises air.

23. A molded article fluid amplifying device as defined in claim 18 or claim 19 wherein said fluid flows along said periphery in a substantially hollow column.

24. A molded article fluid amplifier comprising:
- a first disk and a second disk, said disks having facing planar surfaces;
- said first disk including a passageway for receiving pressurized fluid;
- a chamfered circumferential surface on one of said disks;
- an air channel formed within said planar surfaces, said air channel connecting to said passageway;
- and said planar surfaces being separated sufficiently to permit said pressurized fluid to escape from between said planar surfaces and flow over said chamfered surface to create a flow of fluid over said chamfered surface, said flow of fluid drawing ambient fluid in an axial path of said disks to thereby create an amplified column of flowing fluid.

25. A molded article fluid amplifying device as defined in claim 24 wherein said fluid comprises a coolant.

26. A molded article fluid amplifying device as defined in claim 24 or claim 25 wherein said nozzle comprises a venturi nozzle.

27. A molded article fluid amplifying device as defined in claim 24 or claim 25 wherein said fluid comprises a gas.

28. A molded article fluid amplifying device as defined in claim 24 or claim 25 wherein said fluid comprises air.

29. A molded article fluid amplifying device as defined in claim 24 or claim 25 wherein said fluid flows along said periphery in a substantially hollow column.

30. A post mold cooling apparatus for post mold cooling at least one molded article comprising:
- a holder for supporting the at least one molded article;
- a source of pressurized coolant;
- director means for directing flow of said pressurized coolant toward a selected outer surface portion of said at least one molded article, said director means being shaped so as to enable said pressurized coolant to entrain ambient coolant and thereby provide an increased flow of coolant over said outer surface portion.

31. A post mold cooling apparatus as defined in claim 30 wherein said outer surface portion comprises a neck finish portion of said molded article.

32. A post mold cooling apparatus as defined in claim 30 or claim 31 wherein said director means comprises a base having a rim portion and an insert fitting within said rim portion so as to form a circular nozzle for discharging said pressurized coolant onto said outer surface portion.

33. A post mold cooling apparatus as defined in claim 30 or claim 31 wherein said director means includes a base having a rim portion and an insert confined within said rim portion, said insert including openings for discharging said pressurized coolant onto said outer surface portion in a predetermined direction.

34. A post mold cooling apparatus as defined in claim 33 wherein said predetermined direction is at an angle to said outer surface portion so as to cause said coolant to flow in a vortex around said outer surface portion.

35. A post mold cooling apparatus as defined in claim 33 wherein said openings in said insert direct said pressurized coolant in a direction substantially perpendicular to said outer surface portion.

36. A post mold cooling apparatus as defined in any one of claim 30 or 31 wherein said molded article includes a ledge for supporting said molded article in said holder while permitting said outer surface portion to be exposed to said flow of pressurized coolant.

37. A post mold cooling apparatus for post mold cooling a molded article comprising:

an entry port for receiving a supply of coolant;

a director; and a plurality of exit ports for discharging said coolant;

said director receiving said supply of coolant from said entry port and delivering said coolant to said plurality of exit ports, at least one of said exit ports discharging said coolant onto an outer surface of a neck finish portion of said molded article and at least one of said exit ports supplying coolant to a cooling tube within said molded article to provide coolant to an interior surface of said molded article.

38. A post mold cooling apparatus for post mold cooling a molded article comprising:

an entry port for receiving a supply of coolant;

a director; and a plurality of exit ports for discharging said coolant;

said director receiving said supply of coolant from said entry port and delivering said coolant to said plurality of exit ports, at least one of said exit ports providing focused release of said coolant about an outer surface of a neck finish portion of said molded article and at least one of said exit ports supplying coolant to a cooling tube within said molded article to provide coolant to an interior surface of said molded article.

39. A post mold cooling apparatus for post mold cooling a molded article comprising:

an entry port for receiving a supply of coolant;

a director; and a plurality of exit ports for discharging said coolant;

said director receiving said supply of coolant from said entry port and delivering said coolant to said plurality of exit ports, at least one of said exit ports providing substantially directed distribution of said coolant about an outer surface of a neck finish portion of said molded article and at least one of said exit ports supplying coolant to a cooling tube within said molded article to provide coolant to an interior surface of said molded article.

40. A post mold cooling apparatus for post mold cooling a molded article comprising:

an entry port for receiving a supply of coolant;

a director; and a plurality of exit ports for discharging said coolant;

said director receiving said supply of coolant from said entry port and delivering said coolant to said plurality of exit ports, at least one of said exit ports providing controlled distribution of said coolant about an exposed outer surface portion of said molded article and at least one of said exit ports supplying coolant to a cooling tube within said molded article to provide coolant to an interior surface of said molded article.

41. A post mold cooling apparatus as defined in claim 39 wherein said exposed outer surface comprises a neck finish portion of a preform.

* * * * *